(12) United States Patent
Merz et al.

(10) Patent No.: US 6,696,124 B1
(45) Date of Patent: Feb. 24, 2004

(54) SPECIFIC ADHESIVE COMPOUND SUITABLE FOR EASY REMOVAL

(75) Inventors: Peter W. Merz, Wollerau (CH); Thomas Wirz, Zürich (CH); Bernd Rudi Burchardt, Weiningen (CH)

(73) Assignee: Sika Schweiz AG, Zurich (CH)

( * ) Notice: Subject to any disclaimer, the term of this patent is extended or adjusted under 35 U.S.C. 154(b) by 0 days.

(21) Appl. No.: 09/404,821

(22) Filed: Sep. 24, 1999

(30) Foreign Application Priority Data

Sep. 25, 1998  (CH) .............................................. 1953/98

(51) Int. Cl.$^7$ ................................ B32B 7/12; C09J 7/02
(52) U.S. Cl. ......................... 428/40.1; 428/43; 428/81; 428/105; 428/192; 428/201; 428/343; 428/353; 296/84.1; 296/96.21; 296/96.22; 296/200; 156/108; 156/293; 156/310; 156/500; 427/207.1
(58) Field of Search .............................. 296/84.1, 96.21, 296/200, 96.22; 428/40.1, 43, 38, 81, 105, 120, 172, 192, 200–201, 343, 353; 427/207.1; 156/108, 293, 310, 500

(56) References Cited

U.S. PATENT DOCUMENTS

| | | | |
|---|---|---|---|
| 3,900,655 A | | 8/1975 | Wolgemuth et al. |
| 4,232,080 A | * | 11/1980 | Orain et al. ................. 428/215 |
| 4,270,682 A | * | 6/1981 | Lavoisey et al. ............... 225/1 |
| 4,358,329 A | | 11/1982 | Masuda |
| 4,374,237 A | * | 2/1983 | Berger et al. ................. 528/28 |
| 4,704,175 A | * | 11/1987 | Kunert et al. ................ 156/108 |
| 4,889,678 A | * | 12/1989 | Obata et al. ................. 264/313 |
| 5,057,354 A | * | 10/1991 | Kunert et al. ................ 428/192 |
| 5,085,021 A | * | 2/1992 | Kunert ........................ 52/208 |
| 5,126,208 A | | 6/1992 | Larson |
| 5,342,873 A | * | 8/1994 | Merz et al. ................. 524/425 |
| 5,806,257 A | * | 9/1998 | Cornilis et al. ............... 52/208 |
| 6,001,471 A | * | 12/1999 | Bries et al. .................. 428/343 |
| 6,133,395 A | * | 10/2000 | Miyata et al. ................. 528/28 |
| 6,364,404 B1 | * | 4/2002 | De Paoli ..................... 296/201 |

FOREIGN PATENT DOCUMENTS

| | | | |
|---|---|---|---|
| DE | 37 18 127 | * | 10/1998 |
| EP | 244608 | | 8/1975 |

* cited by examiner

Primary Examiner—Harold Pyon
Assistant Examiner—Brian P. Egan
(74) Attorney, Agent, or Firm—Burns, Doane, Swecker & Mathis, L.L.P.

(57) ABSTRACT

An adhesive compound is described that is formed using a specific adhesive system. Due to the specific adhesive system the disconnecting of the adhesive compound is considerably eased, which, in particular, is of great benefit for the quick removal of plastic windows in case of emergency. The specific properties of the adhesive compound are based on its specific structure. In the middle of the compound between the substrates a specific parting layer is installed by which the two substrates can be disconnected easily. The parting layer preferably is an elastomer that has an extremely high tenacity and an elongation at rupture of 500% up to more than 1500% and that shows a good adherence to the assembly adhesive so that the removal can be performed by stretching the parting layer whereby it constricts and thereby peels off from the adhesive.

17 Claims, 5 Drawing Sheets

SPECIFIC ADHESIVE COMPOUND SUITABLE FOR EASY REMOVAL

CROSS REFERENCE TO RELATED APPLICATIONS

This application claims the priority of the Swiss patent application No. 1953/98, filed Sep. 25, 1998, the disclosure of which is incorporated herein by reference in its entirety.

BACKGROUND OF THE INVENTION

The present invention concerns an adhesive compound based on a specific adhesive system that makes easy disconnection of substrates that have been connected by it by disconnecting the adhesive compound. In particular/this is of great benefit for the quick removal of plastic windows in case of emergency.

Adhesive system, in this case, means all materials that participate in a compound of two substrates. Since in a suitable adhesive system all materials must have good adhesive properties to each other, a compound is formed when an adhesive system is applied to substrates, or more precise, an adhesive compound is formed.

As per the state of the art, the disconnection of an adhesive compound, for example in case of a replacement of a window of a car, is performed by cutting with mechanical means, e.g. with a vibration cutting knife or a cutting wire. In specific cases, the removal of the vehicle window has to be done extremely quick, for example bus windows are destroyed with a hammer in case of emergency in order to enable the passengers to quickly leave the bus.

Due to reasons of weight and based on safety considerations, i.e. no splintering in case of damage of the window, there is the wish to replace these bus windows made from glass by plastic windows.

Since such plastic windows cannot be easily destroyed by mechanical means, e.g. by means of a hammer, there is the need for an adhesive system that allows for easy and quick disconnection of the compound, i.e. that allows for an easy and quick removal of the windows. Under the light of the simplicity of recycling, an easy disconnection of an adhesive compound is desirable as well.

In case of emergency, the cutting of the adhesive compound with the vibration cutting knife or the cutting wire is unsuitable. In case of emergency it is mandatory that the plastic windows can be removed by the passengers from the inside of the vehicle. This is quite difficult due to the large adhesive compound surfaces with a width of up to 5 cm that are commonly used in building buses.

BRIEF SUMMARY OF THE INVENTION

Therefore, it is the object of the present invention to provide an adhesive compound based on a specific adhesive system that allows for a quick and easy disconnection of the adhesive compound without destruction of at least one of the substrates. In particular, to provide an adhesive system that allows for an easy removal of mechanically undestroyable plastic windows, e.g in buses, for everyone and from one side, e.g. from the inside of the vehicle, and that is economical. Furthermore it is the object of the invention to provide modules for the manufacturing of such adhesive compounds and to provide methods for the manufacturing of such modules and of such adhesive compounds as well as to provide a method for destroying such adhesive compounds.

In one aspect of the invention, an adhesive compound is disclosed wherein between two substrates two layers of modular adhesive are located and wherein between said two layers of modular adhesive a parting layer made of elastic material is installed over the whole geometry of the joint.

In another aspect of the invention, a module for the manufacturing of an adhesive compound is disclosed that comprises an adhesive layer and, on said adhesive layer, a parting layer located in the edging area of a substrate.

In yet another aspect of the invention, a method for manufacturing a module is disclosed wherein along the circumference of said substrate, first one adhesive layer and after that one parting layer is applied.

In a further aspect of the invention, a method for manufacturing an adhesive compound is disclosed wherein, first a parting layer is applied along the circumference of a substrate by means of an adhesive layer so that a module is formed that can be further processed either immediately or after intermediate stocking and/or transportation, and wherein either on this module or on a second substrate that shall be conglutinated, a second adhesive layer is applied and wherein said second substrate and said module are conglutinated by means of said second adhesive layer In a final aspect of the invention, a method for destroying an adhesive compound is disclosed wherein the parting layer made of elastic material is stretched so that it peels off from the adhesive layers and thereby disconnects the adhesive compound.

BRIEF DESCRIPTION OF THE DRAWINGS

The invention will be better understood and objects other than those set forth above will become apparent when consideration is given to the following detailed description thereof. Such description makes reference to the annexed drawings, wherein.

In the figures mean:
1=(plastic)window
2=assembly adhesive, thickness of the layer about 2 mm
3=organic parting layer (rip strap), about 2 mm in thickness
4=flange
5=rip ring

DETAILED DESCRIPTION OF THE INVENTION

Figure 1:
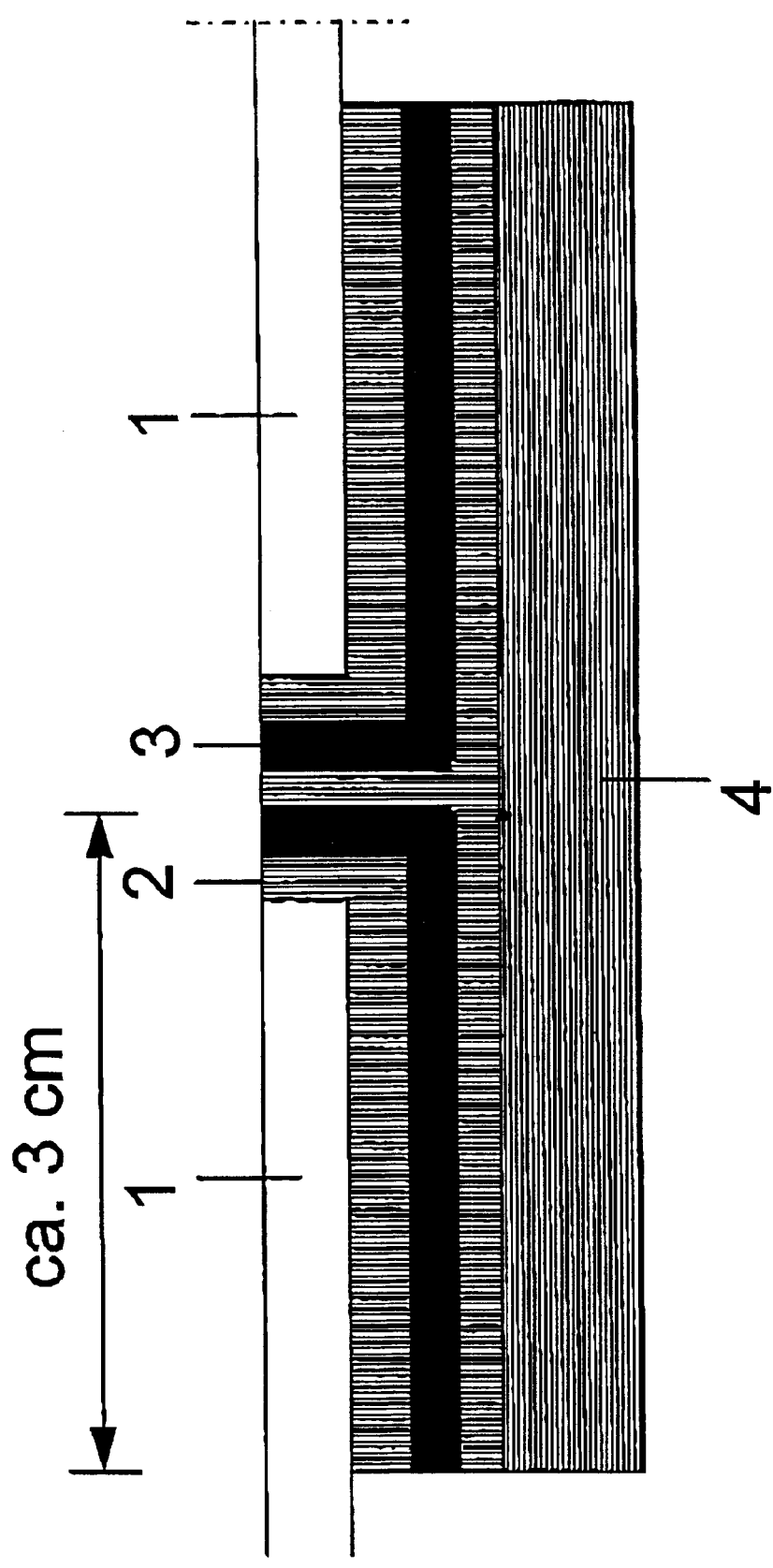
FIG. 1 shows the structure of an adhesive compound according to the invention made of a flange, an adhesive system and a plastic window.

As already mentioned above, the adhesive system according to the invention respectively the adhesive compound (see FIG. 1) are based on a specific structure in which between the substrates 1, 4, in particular between one plastic window 1 and one flange 4 and between two assembly adhesive layers 2, a specific polymeric intermediate layer (parting layer) 3 is located by which the two substrates can be disconnected easily.

The parting layer 3 that is necessary for the structure must be an elastomere, preferably a non-aging elastomere that has an extremely high elongation at rupture of 500% and more, in particular of 500% up to more than 1500% and that shows a good adherence to the assembly adhesive 2.

Figure 2:
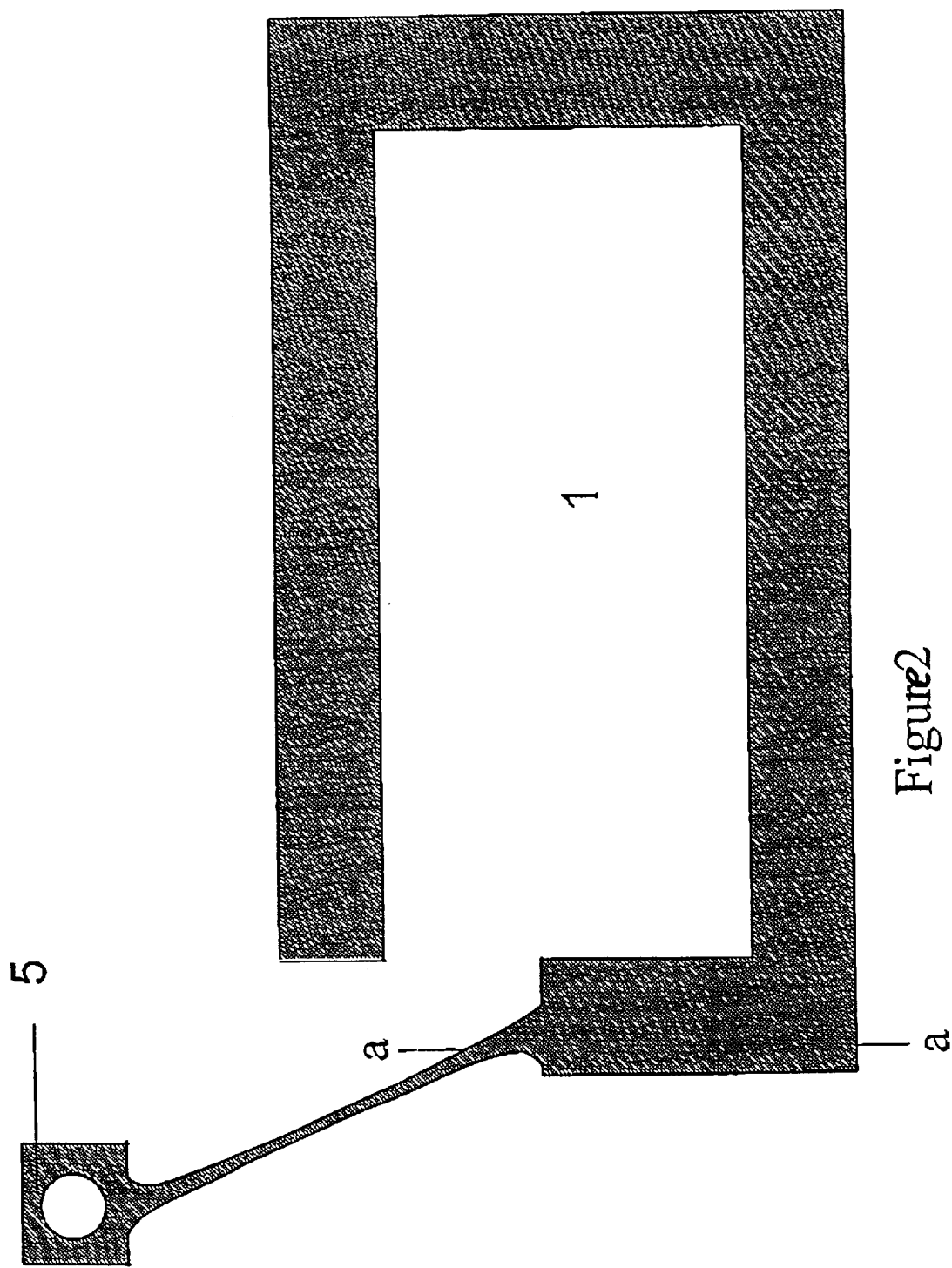
FIG. 2 shows the change of the parting layer under tractive force during the removal of the window in top view on the window.
Figure 3:
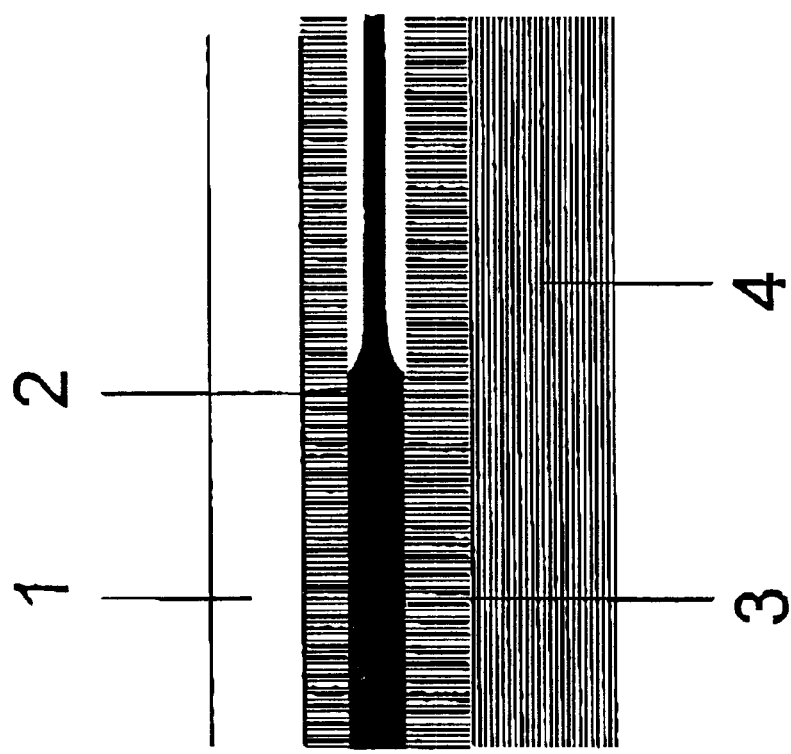
FIG. 3 shows the change of the parting layer under tractive force during the removal of the window in a cross sectional view of the window along line a—a of FIG. 2.

The non-aging elasticity of the parting layer 3 must be very high, so that the parting layer 3 constricts when being stretched in a way that it can be peeled away from the adhesive 2 due to the resulting tensions and consequently a disconnection of the compound results (see FIGS. 2 and 3). The disconnection results from the constriction of the rip strap that leads to a high concentration of tension in the contact surface and thereby effects a disconnection of the adhesive compound.

Furthermore, a good adherence between the parting layer 3 and the adhesive 2 is necessary in order to guarantee a safe compound during the desired time span, e.g. a safe compound between the plastic window 1 and the flange 4 of a vehicle for the lifetime of said vehicle.

Figure 4:
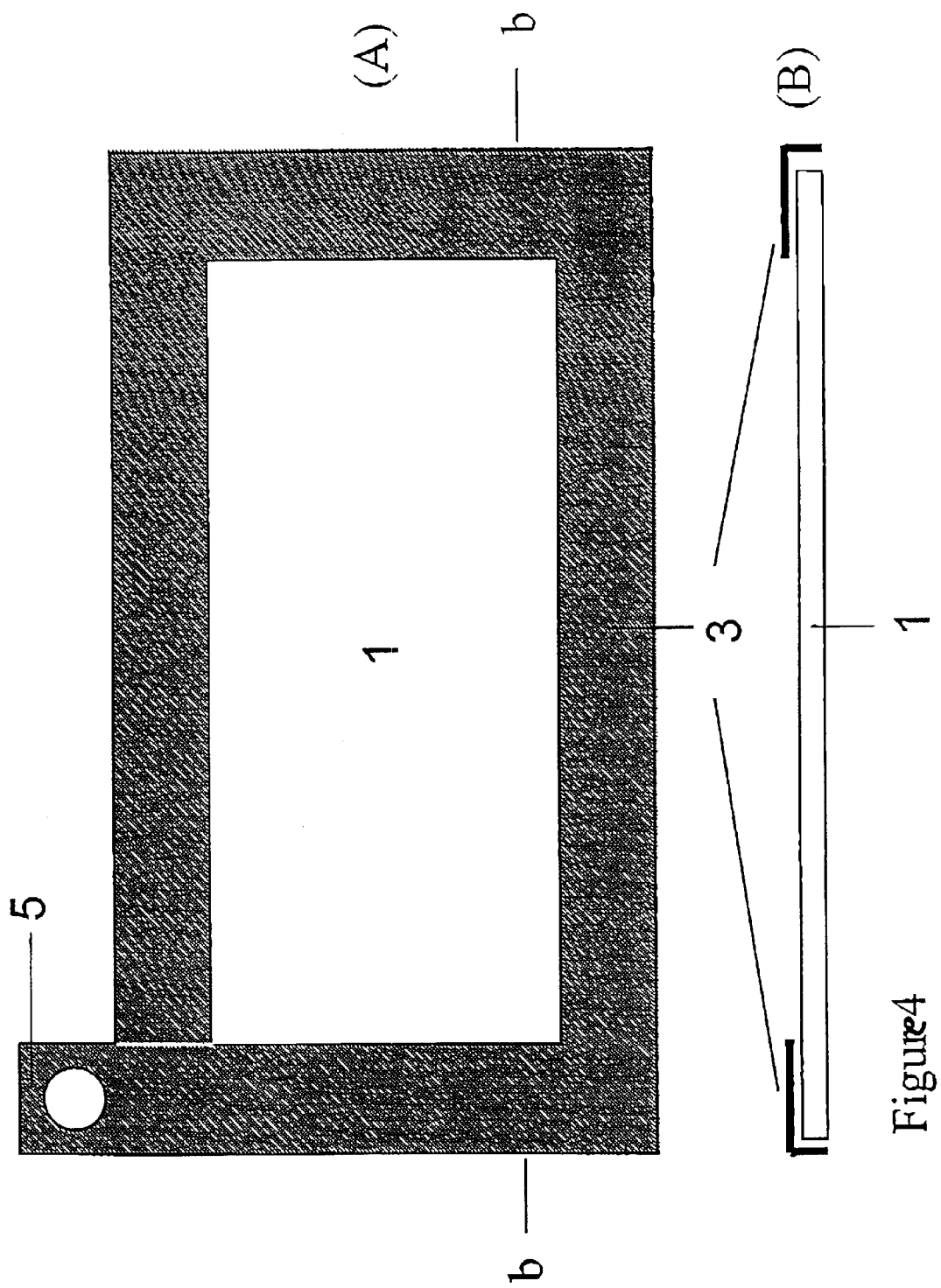
FIG. 4 shows a window module according to the invention in top view (A) and in cross sectional view (B) along line b—b of (A).

A suitable material for the parting layer 3 that suits the above mentioned requirements is e.g. described in the patents EP 0244608 B1 and U.S. Pat. No. 5,342,873. In this case, it is a humidity hardening melt type adhesive on the basis of polyurethane technology, i.e. an elastic polyurethane adhesive that is tenacious plastic at room temperature. These caoutchouc like melt type adhesive can be processed in various ways. It can, for example in order to ease and speed up production, be formed at room temperature to the desired profile by means of a press (e.g. for the conglutination of plastic windows for buses, rail vehicles, ships etc. to a L-shaped profile) and after that hardens with the humidity of the air to a high quality, high tenacious and highly elastic elastomere, that as the case may be, is than conglutinated to one of the substrates, e.g. the window. Another possibility is to apply such a reactive melt type adhesive at temperatures of about 95° C. by means of a robot onto a separating foil or—to ensure the inherent stability also with complicated and, what regards the stableness, quite demanding shaping—on a separating form, e.g. made of teflon, of the desired dimensions and to glue it along the circumference of the substrate, e.g. the circumference of the plastic window 1, after hardening by humidity. Respective embodiments for window modules are shown in the FIGS. 4 and 5.

For an efficient processing it is of advantage that a plastic window module (see FIGS. 4 and 5) is supplied directly to the production line of the vehicle manufacturer.

For the conglutination of the parting layer 3 with the plastic window 1, that is with advantage performed in advance by the supplier, and for the assembly of the plastic window to the vehicle flange 4, commercially available single component polyurethane adhesives like, e.g. medium or high modulus SIKAFLEX® products from Sika AG, Zurich, Switzerland, can be used as before.

One essential aspect is the exact balanced adherence structure between the adhesive 2 and the parting layer 3, that must be designed in such way that on one hand, the adherence is guaranteed under all usual stresses over the lifetime of the vehicle, and on the other hand, a removal is possible with well defined forces due to purposeful rupture of the adherence between the layers. For this it can be useful to use primers during the manufacturing process of the plastic window modules according to the invention which are on the one hand beneficial for the adherence and on the other hand promote, due to the their distinctive brittleness in comparison to the parting layer 3 and to the preferred polyurethane adhesive 2, the separation of the parting layer 3 from the adhesive 2 during removal.

Figure 5:
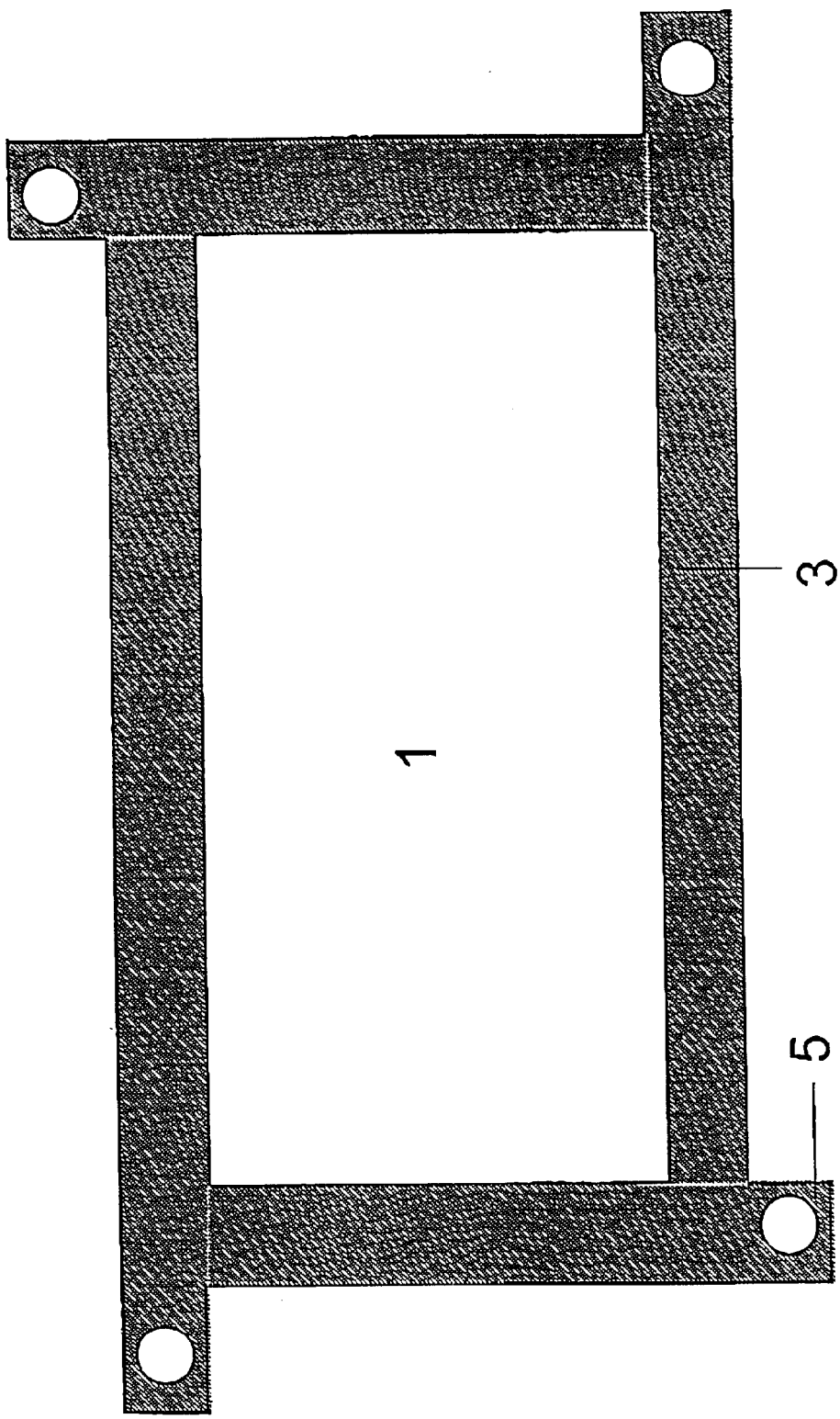
FIG. 5 shows another embodiment of the window module with 4 rip straps that, in particular, is equipped for quicker removal.

To make the plastic window 1 quicker removable by the passengers that are in emergency of help by means of the parting layer 3, the parting band that is applied along the edging of the plastic window 1 can be divided into sections, e.g. for every edge one rip strap (see FIG. 5).

It is also possible to attach by purpose at one sticking out end of the parting band a means to ease pulling, e.g. a handle or a rip ring 5, that enables the handling and the necessary pulling also for untrained persons.

While there are shown and described presently preferred embodiments of the invention, it is to be distinctively understood that the invention is not limited thereto but may be otherwise variously embodied and practised within the scope of the following claims.

What is claimed is:

1. An adhesive article for adhering two opposing substrates comprising: two opposing layers of modular adhesive, and an elastomeric parting layer interposed between said layers of modular adhesive, wherein the parting layer forms a joint uniformly distributed in the area between the modular adhesive layers, and the parting layer peels off from the adhesive layers when the parting layer is stretched.

2. The adhesive article according to claim 1, wherein said parting layer has an elongation at rupture of 500% up to 1500%.

3. The adhesive article according to claim 1, wherein said parting layer is a polyurethane.

4. The adhesive article according to claim 1, which includes at least one layer of at least one primer between at least one layer of modular adhesive and said parting layer.

5. The adhesive article according to claim 1, wherein said parting layer is an elastic polyurethane adhesive having an elongation at rupture of 500% up to 1500%.

6. The adhesive article according to claim 1, wherein said modular adhesive comprises a single component polyurethane adhesive.

7. The adhesive article according to claim 1, wherein said parting layer includes a tool that improves the grasping of the parting layer and therefore improves the application of tractive forces to said parting layer.

8. The adhesive article according to claim 7, wherein said tool is a handle or a ring.

9. The adhesive article according to claim 1, wherein said parting layer is a polyurethane elastomer having an elongation at rupture of 500% to 1500% and said modular adhesive comprises a single component polyurethane.

10. An article of manufacture comprising a plastic window and a flange bonded together with the adhesive article of claim 9.

11. An article of manufacture comprising two opposing substrates bonded together with the adhesive article of claim 1.

12. The article of manufacture according to claim 11, wherein said two substrates are one flange and one plastic window.

13. Module for the manufacturing of an article of manufacture according to claim 11, said module comprising a substrate, a modular adhesive layer and, on said adhesive layer, a parting layer composed of an elastomer located in the edging area of said substrate, wherein the parting layer has the property of peeling away from the adhesive layer when the parting layer is stretched.

14. Module according to claim 13, wherein said substrate is a plastic window.

15. Module according to claim 13, wherein said parting layer is a polyurethane elastomer and said modular adhesive is a single component polyurethane adhesive.

16. Module according to claim 13, wherein said parting layer is a parting layer that is fitted to said edging area.

17. Module according to claim 16, wherein said parting layer is a parting layer profile.

* * * * *